United States Patent [19]

Hirshberg et al.

[11] Patent Number: 4,852,938
[45] Date of Patent: Aug. 1, 1989

[54] TRANSPARENT ROOF CONVERTIBLE AUTOMOBILE WITH RETRACTABLE SUNSHADE

[75] Inventors: Gerald P. Hirshberg; Joseph E. Mrozowski, both of Del Mar; Stephen D. Ball, San Diego, all of Calif.

[73] Assignee: Nissan Design International, Inc., San Diego, Calif.

[21] Appl. No.: 204,696

[22] Filed: Jun. 9, 1988

Related U.S. Application Data

[63] Continuation-in-part of Ser. No. 11,302, Feb. 5, 1987, abandoned, which is a continuation-in-part of Ser. No. 855,821, Apr. 24, 1986, abandoned.

[51] Int. Cl.⁴ .............................................. B60J 7/047
[52] U.S. Cl. .................................... 296/214; 296/216; 296/220; 49/65
[58] Field of Search ............... 296/211, 214, 215, 216, 296/218, 220, 222; 49/63, 65

[56] References Cited

U.S. PATENT DOCUMENTS

| | | | |
|---|---|---|---|
| 2,289,173 | 7/1942 | Best | 296/107 |
| 2,785,922 | 3/1957 | Chika | 296/107 |
| 3,044,825 | 7/1962 | Golde | 296/216 |
| 3,713,689 | 1/1973 | Pudolan et al. | 296/220 |
| 3,720,440 | 3/1973 | Podolan | 296/220 |
| 3,823,977 | 7/1974 | Fioravanti | 296/107 |
| 3,964,784 | 6/1976 | Prechter et al. | 296/220 X |
| 4,168,859 | 9/1979 | Breitschwerdt et al. | 296/102 X |
| 4,274,672 | 6/1981 | Kuroda | 296/216 |
| 4,286,821 | 9/1981 | Cooper | 296/216 |
| 4,415,195 | 11/1983 | Furukawa | 296/146 |
| 4,463,983 | 8/1984 | Hellriegel | 296/213 |
| 4,474,405 | 10/1984 | Kloppe et al. | 296/220 |
| 4,592,586 | 6/1986 | Yagami et al. | 296/218 |
| 4,619,480 | 10/1986 | Motoyama et al. | 296/217 |
| 4,650,244 | 3/1987 | Boots | 296/223 |
| 4,664,440 | 5/1987 | Kano et al. | 296/214 |
| 4,695,090 | 9/1987 | Draper | 296/216 |
| 4,700,982 | 10/1987 | Kuraoka et al. | 296/107 |

FOREIGN PATENT DOCUMENTS

| | | | |
|---|---|---|---|
| 101322 | 2/1984 | European Pat. Off. | 296/222 |
| 1455459 | 4/1969 | Fed. Rep. of Germany | 296/216 |
| 1580709 | 11/1970 | Fed. Rep. of Germany . | |
| 2723996 | 11/1978 | Fed. Rep. of Germany | 296/216 |
| 3223136 | 3/1983 | Fed. Rep. of Germany | 296/220 |
| 149213 | 11/1981 | Japan | 296/218 |
| 58-85713 | 5/1983 | Japan | 296/216 |
| 143719 | 8/1984 | Japan | 296/222 |
| 405418 | 2/1934 | United Kingdom . | |

Primary Examiner—Dennis H. Pedder
Attorney, Agent, or Firm—Baker, Maxham, Jester & Meador

[57] ABSTRACT

An automobile body is provided with a transparent roof panel that slides rearwardly from a normal position in which it closes a roof opening of the body, to a retracted position in which it overlies a rear window of the body. A sunshade mounted below the transparent roof panel is automatically slid rearwardly into a stowed position adjacent a roll bar separating the roof opening and the rear window when the transparent roof is moved to its retracted position. When the transparent roof is in its normal position in which it closes the roof opening, the sunshade may be manually slid back and forth to overlap varying portions of the transparent roof panel.

4 Claims, 4 Drawing Sheets

TRANSPARENT ROOF CONVERTIBLE AUTOMOBILE WITH RETRACTABLE SUNSHADE

CROSS-REFERENCE TO RELATED APPLICATION

This application is a continuation-in-part of U.S. patent application Ser. No. 11,302 of Gerald P. Hirshberg et al. filed Feb. 5, 1987, now abandoned which was in turn a Continuation-in-Part of application Ser. No. 855,821 of Gerald P. Hirshberg et al. filed Apr. 24, 1986 and now abandoned.

BACKGROUND OF THE INVENTION

The present invention relates to vehicle body retractable tops, and more particularly, to vehicle body retractable roof top panels and cooperating sunshade panels that translate between normal and storage positions.

Various convertible car tops of both the hard and collapsible fabric type are well known in the automobile industry. A major disadvantage of the fabric convertible top is that it can be easily torn. It also gives the car a noisier ride and is much more subject to sun and other weather-related damage than a hard top. Convertible hard tops tend to have complicated and cumbersome constructions. Recently sun roofs have enjoyed considerable commercial success because they offer an inexpensive alternative to a true convertible. However, pop-up sun roofs do not give an open air feeling. Rearwardly retracting sun roofs can only open the forward half of a passenger sedan roof because the sun roof must be stowed in the remaining half. Therefore retracting sun roofs are generally not used in two-seat sports cars. Some sports cars have used hard tops which are completely removable. Other sports cars have so-called "T-tops" which comprise glass roof sections which are completely removable from either side of a central, longitudinally extending roof beam. Removable hard top roofs and roof panels are inconvenient and cumbersome. Often the removable roof or roof panels take up too much space to be stored in the trunk of a sports car and must therefore be stored in a garage. This makes it impractical to convert to the open roof configuration while "on the road."

In automobiles having transparent roof panels, it is desirable to tint the same to shade the driver and passenger from direct sunlight when the panels are closed.

British Pat. No. 405,418 discloses a flexible fabric, metal or wood sliding roof panel for an auto. The roof panel slides in curved fashion to a retracted position within the side walls of the car body at all times. In the retracted position, the roof panel overlies the rear window of the car. Accordingly, the sliding roof panel has a glass panel insert which coincides with the rear window to allow rearward visibility.

U.S. Pat. No. 3,713,689 of Podolan et al. (assigned to GM) discloses a hard top roof having front and rear panels which slide into overlapping horizontal relation.

U.S. Pat. No. 3,044,825 of Golde discloses another solid sun roof which retracts to a stored position within the car body sides and forward of the rear window.

U.S. Pat. No. 4,168,859 of Breitschwerdt et al. (assigned to Daimler-Benz) discloses a sports car with an upper body part including a roof and sidewalls which together are displaced rearwardly. The rear window cranks downwardly into a recessed position.

U.S. Pat. No. 4,463,983 of Hellriegel (assigned to Ford) discloses a plastic sandwich, retractable sun-roof.

U.S. Pat. No. 3,720,440 of Podolan (assigned to GM) appears to be related to the same design as U.S. Pat. No. 3,713,689 above. The '440 patent also discloses a hard top with rearwardly slideable, overlapping panels.

U.S. Pat. No. 3,823,977 of Fioravanti discloses a solid roof panel that rotates into overlapping relationship with the trunk lid so that the trunk can still be opened.

U.S. Pat. No. 4,474,405 of Kloppe et al. (assigned to Ford) discloses a sliding louvered roof for an auto.

U.S. Pat. No. 4,415,195 of Furukawa et al. (assigned to Suzuki) discloses clam shell side windows which rotate toward each other.

German Pat. No. 2723-996 discloses a roof panel that slides rearwardly of the roll bar and then drops down on top of the trunk to keep the rear view unobstructed.

German Pat. No. 1,455,459 discloses a completely detachable roof for an auto.

U.S. Pat. No. 4,274,672 assigned to Honda discloses a sliding roof member for an auto having a separate sunshade which slides along with the roof member when the same is retracted to open the roof opening. When the roof member is closed, the sunshade can be slid back and forth independent of the roof member. The roof member 13 is made of glass and the sunshade member 15 is made of an unspecified opaque material.

European patent application No. 0 101 322 of MGA Developments Limited discloses a sedan-type auto with a transparent roof panel that moves to a stored position in the trunk.

Japanese patent application No. 56-149213(A) of Fujimoto discloses an auto with a sun roof panel that slides into a horizontal stored position on the rear deck of the car body.

SUMMARY OF THE INVENTION

It is therefore the primary object of the present invention to provide a combination retractable roof and sunshade construction for an automobile.

According to the present invention, an automobile body is provided with a transparent roof panel that slides rearwardly from a normal position in which it closes a roof opening of the body, to a retracted position in which it overlies a rear window of the body. A sunshade mounted below the transparent roof panel is automatically slid rearwardly into a stowed position adjacent a roll bar separating the roof opening and the rear window when the transparent roof is moved to its retracted position. When the transparent roof is in its normal position in which it closes the roof opening, the sunshade may be manually slid back and forth to overlap varying portions of the transparent roof panel.

DESCRIPTION OF THE PREFERRED EMBODIMENTS

The entire disclosure of our U.S. patent application Ser. No. 204,105 entitled "Transparent Roof Convertible Automobile" filed on June 8, 1988, now U.S. Pat. No. 4,801,174 is specifically incorporated herein by reference.

Figure 1:
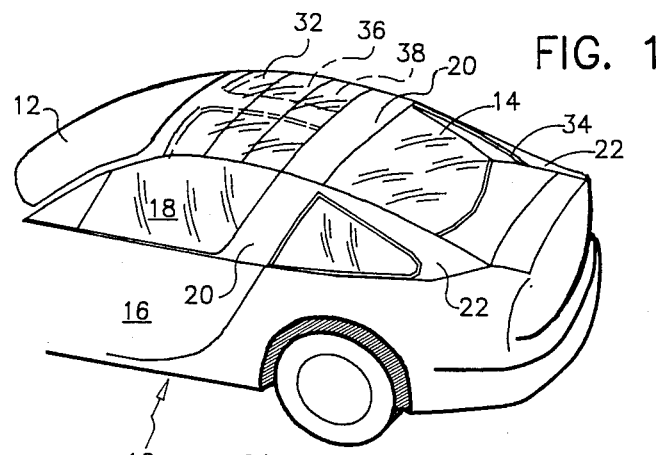
FIGS. 1-3 are a sequence of perspective views illustrating the structure and operation of a preferred embodiment of the invention.
Figure 2:
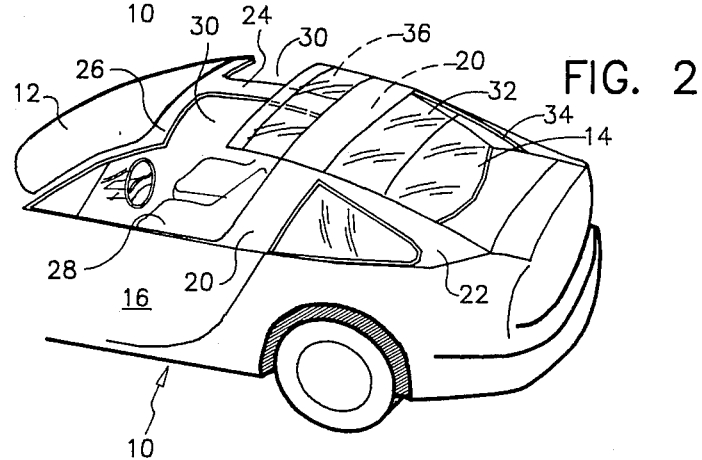
Figure 3:
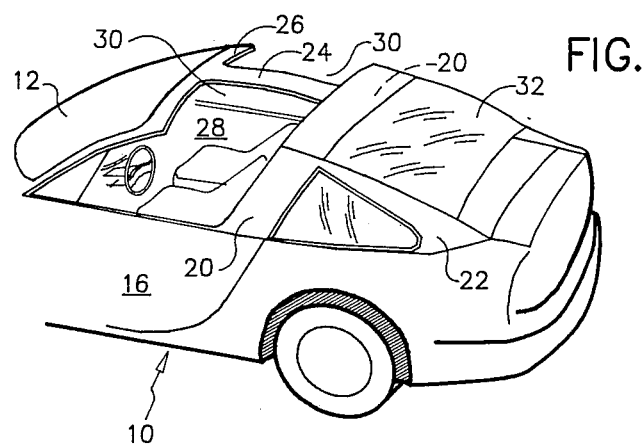

Referring to FIG. 1, in a preferred embodiment of the present invention, an automobile body 10 has a front windshield 12, a rear window 14 and a pair of side panels in the form of doors 16 of the so-called "frameless" type, i.e., they do not have any frame surrounding the door windows 18 when the same are raised. A roll bar 20 extends transversely across the body 10. A pair of rear window pillars 22 extend in an inclined fashion between the opposite sides of the roll bar 20 and the rear of the body 10 on either side of the rear window 14. A T-bar or support beam 24 (FIGS. 2 and 3) extends longitudinally from the center of a forward transverse window frame member 26 to the center of the roll bar 20. Thus, the windows and doors of the automobile body define a two-seat passenger compartment 28 with a roof opening generally designated 30 divided by the T-bar 24.

A rectangular transparent roof panel 32 (FIG. 1) is mounted for generally translatory movement in a longitudinal direction relative to the body 10 between a normal position in which it closes the roof opening 30 to a retracted position (FIG. 3) in which it overlies the rear window 14, leaving the roof opening 30 completely uncovered. The transparent roof panel 32 may be made of shatterproof automotive glass, LEXAN (Trademark) plastic or other suitable transparent material. The roof panel is slightly curved and has an area slightly larger than that of the divided roof opening 30. The transparent roof panel is mounted for sliding movement above the roll bar and between the rear pillars 22. From its normal position illustrated in FIG. 1 in which it covers the roof opening, the roof panel 32 is slideable rearwardly through an intermediate position illustrated in FIG. 2, and then to the retracted position illustrated in FIG. 3, which leaves the roof opening 30 completely uncovered. When the roof panel 32 is in its retracted position, it overlies the rear window 14 so that a person seated in the passenger compartment can view in a rearward direction through both the rear window 14 and the roof panel 32. Preferably the angle between the rear window and the overlying transparent roof panel is less than five degrees to eliminate the double reflections of following headlights the driver would otherwise see when looking rearward through the same. When the roof panel is in its normal (closed) position illustrated in FIG. 1, the leading edge of the roof panel 32 mates with the transverse window frame member 26 and the tailing edge of the roof panel 32 coincides with the trailing edge of the roll bar 20. When the transparent roof panel 32 is in its retracted position illustrated in FIG. 3, the leading edge of the panel coincides with the leading edge of the roll bar 20.

A drive mechanism in the form of an electric motor and gear-driven linkage (not illustrated) are mounted inside the roll bar 20 and T-bar 24 for moving the transparent roof panel 32 between its normal (closed) position and its retracted position. These may have constructions similar to motorized sun roofs in automobiles currently on the market. An example of such a drive is disclosed in co-pending U.S. patent application Ser. No. 855,821, now abandoned, identified above.

Mounting means (not illustrated) are provided for slidingly attaching a front center portion of the transparent roof panel 32 to the drive linkage that travels in the T-bar 24, as disclosed in the aforementioned co-pending U.S. patent application Ser. No. 855,821, now abandoned.

The rear window pillars 22 (FIG. 1) are provided with slots or tracks 34 in the inward sides thereof which slideably receive the side edges of the transparent roof panel 32. Wheels or other mechanisms (not illustrated) may be connected to the side edges of the roof panel and/or the tracks 34 to facilitate sliding movement of the roof panel. The tracks 34 also extend above a recessed or lowered intermediate portion 20a (FIGS. 7 and 9) of the roll bar 20 and are attached to raised side portions 20b (FIGS. 4 and 7) of the roll bar which extend above the intermediate portion 20a. The segments of the tracks 34 attached to the roll bar 20 connect with the segments that extend along the rear window pillars 22. The intermediate portion 20a of the roll bar is recessed or lowered relative to tracks 34 in order to permit the passage of the roof panel over the intermediate roll bar portion. This is further visible in FIGS. 1–3 where the upper curved surface of the roof panel 32 is illustrated as meeting the upper edges of the raised side portions 20b of the roll bar. The upper curved surface of the roof panel also extends co-linear with the upper edges of the rear window pillars 22.

Figure 4:
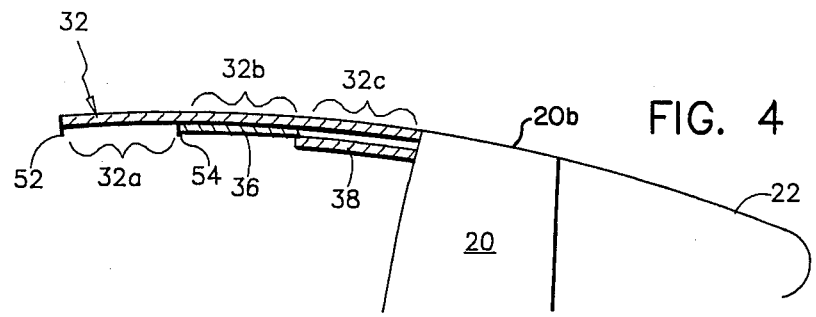
FIGS. 4-6 are a sequence of simplified diagrammatic side elevation views of the preferred embodiment illustrating the manner in which the overlapping sunshade panels are automatically stowed when the transparent roof panel slides to its retracted position.
Figure 8:
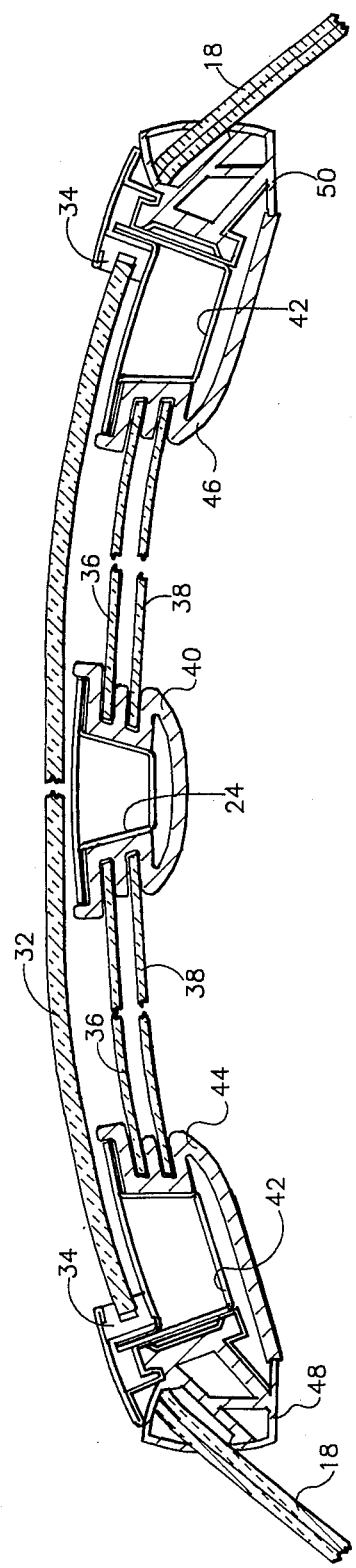
FIG. 8 is an enlarged, fragmentary, vertical sectional view taken along line 8—8 of FIG. 7 illustrating construction details of the preferred embodiment.

Referring to FIGS. 4 and 8, the preferred embodiment of the invention includes four slideable, overlapping upper and lower sunshade panels 36 and 38. These sunshade panels may be opaque to completely prevent the passage of sunlight. In such a case they may be made of, for example, lightweight black-anodized Aluminum or black plastic. Alternatively, the sunshade panels can be made to attenuate the passage of sunlight. In such a case they may be made of tinted plastic, for example.

An encapsulation or track member 40 (FIG. 8) surrounds and is connected to the T-bar 24 and has slots formed therein on each side thereof for each receiving the inner longitudinal edge of a corresponding one of the sunshade panels. The T-bar 24 is preferably made of metal, such as Aluminum. A hollow, box-shaped rectangular frame 42 is attached to the underside of the transparent roof panel 32. The frame 42 extends around all four sides of the periphery of the roof panel to reinforce the same. The frame 42 is also preferably made of metal, such as Aluminum.

Encapsulations 44 and 46 (FIG. 8) surround the longitudinally extending segments of the frame 42. These encapsulations are formed with slots for each receiving the outer longitudinal edge of a corresponding one of the sunshade panels 36 and 38. The encapsulations 40, 44 and 46 are preferably made of a rigid plastic material. Additional longitudinal encapsulations 48 and 50 attached to the outer longitudinally extending sides of the reinforcing frame 42 have slots formed therein for slideably receiving the upper edges of door windows 18. These latter encapsulations are preferably made of a deformable plastic material to provide a tight seal with the windows 18 to prevent rain or other water from passing into the passenger compartment.

Figure 6:
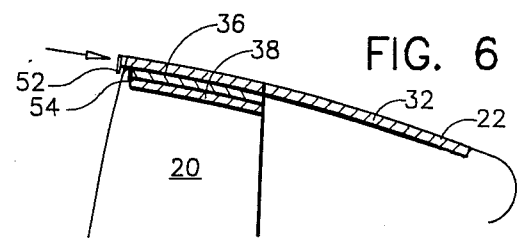

Referring again to FIG. 4, the forward one-third 32a of the transparent roof panel is preferably tinted. This is a band or portion of the roof panel extending transversely from side to side but only the first one-third of the longitudinal dimension thereof moving rearwardly from the leading edge of the roof panel. By way of example, if the roof panel 32 is glass, the underside of the forward one-third thereof may be vapor-plated with silver. One suitable glass is sold under the trademark VARI-TRAN by Libbey-Owens Ford. The latter two-thirds of the roof panel 32, which overlie the rear window 14 when the roof panel is in its retracted position illustrated in FIG. 6, is not tinted so as to avoid any degradation of visibility when the driver looks through both the rear window and retracted roof panel. When the roof panel is fully retracted, the forward one-third thereof which is tinted overlies the roll bar 20.

Since the forward one-third of the transparent roof panel 32 is tinted, the retractable sunshade panels 36 and 38 are dimensioned to cover the remaining untinted two-thirds of the roof panel. The two upper sunshade panels 36 cover the intermediate one-third 32b (FIG. 4) of the roof panel when in their fully closed positions. The two lower sunshade panels 38 cover the remaining or rearward one-third of the roof panel when in their fully closed positions illustrated in FIG. 4. The longitudinal dimension of the transparent roof panel 32 is approximately three times the longitudinal dimension of the roll bar 20. Since the forward one-third of the roof panel overlaps the roll bar when the roof panel is fully retracted, it can be heavily tinted, or even opaque.

Figure 5:
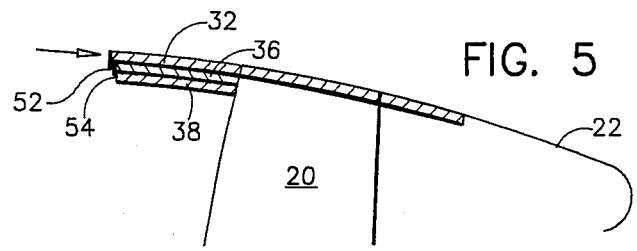
Figure 7:
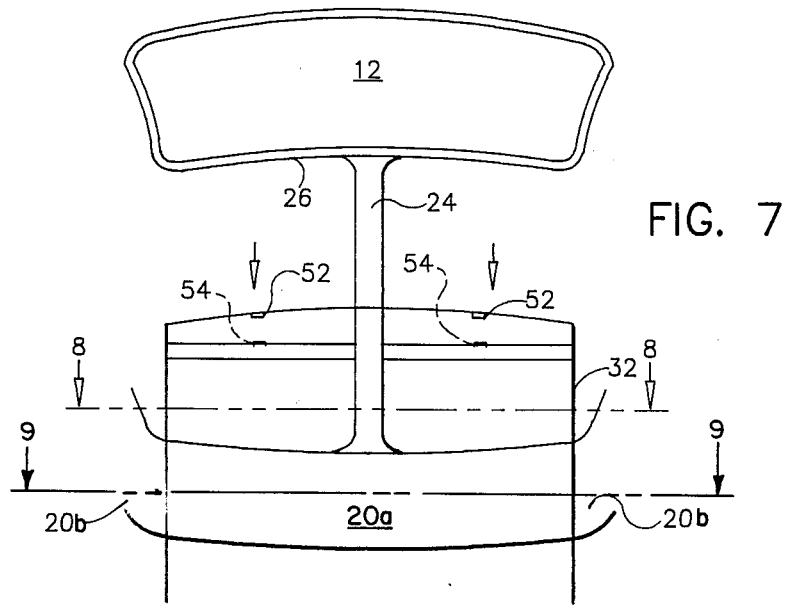
FIG. 7 is a simplified diagrammatic top plan elevation view of the preferred embodiment further illustrating the construction and operation thereof.
Figure 9:
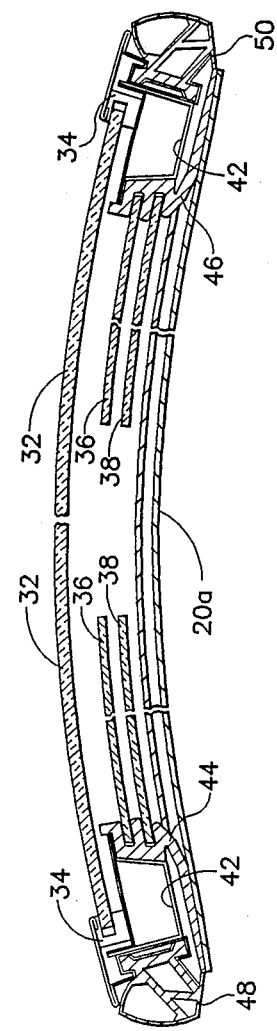
FIG. 9 is an enlarged, fragmentary, vertical sectional view taken along line 9—9 of FIG. 7 illustrating the movement of the roof panel and the sunshade panels over the roll bar in the preferred embodiment.

The preferred embodiment is designed so that when the transparent roof is moved from its normal (closed) position to its fully retracted position, the sunshade panels 36 and 38 will automatically move to their rearward stowed positions above the roll bar 20. When the roof panel is thereafter moved to its closed position, the sunshade panels will stay in their stowed positions. The driver or passenger can then manually slide the panels forwardly, on his or her side of the vehicle, to partially or completely cover the untinted rear two-thirds of the transparent roof panel to lessen or attenuate the sun that would otherwise shine therethrough. Referring to FIGS. 4 and 7, the leading edge of the transparent roof panel 32 is provided with a pair of downwardly extending fingers 52. Similarly, the leading edges of the upper sunshade panels 36 are each provided with a downwardly extending finger 54. When the roof panel moves roughly one-third of its travel rearwardly from its closed position, the fingers 52 engage the leading edges of the upper sunshade panels 36. Thereafter, as the roof panel continues to move rearwardly (to the right in FIGS. 4–6), the fingers 52 push the upper sunshade panels rearwardly along with the roof panel. When the roof panel has moved roughly two-thirds of its travel rearwardly, the fingers 54 extending downwardly from the upper sunshade panels 36 engage the leading edges of the lower sunshade panels 38 as illustrated in FIG. 5. Thereafter, continued rearward movement of the roof panel to its fully retracted position moves both the upper and lower sunshade panels 36 and 38 to their fully stowed positions above the roll bar 20 as illustrated in FIGS. 6 and 9. It will be understood that as the roof panel is moving the sunshade panels, the longitudinal edges of the sunshade panels slide in the slots of the encapsulations 40, 44 and 46 (FIG. 8).

When the transparent roof panel 32 is in its fully retracted position, the fingers 52 (FIG. 6), which extend downwardly from the leading edge thereof, prevent the sunshade panels from being pulled forwardly from their stowed positions. This is an important safety feature since the panels could vibrate or even tear free if closed or partially closed when the automobile is traveling at a high rate of speed and substantial airflow is encountered. Clearly, the driver and passenger have no need for shading anyway when the roof panel is fully retracted since the whole idea of retracting the roof panel is to enjoy the sunshine in the first place. Also, the automobile is preferably provided with an interlock which permits the driver to open and close the transparent roof panel only when the vehicle is stationary, e.g., when the ignition key is in an accessory position. This avoids the situation where the transparent roof panel would be partially open during high speed travel of the automobile. Under such circumstances, the substantial airflow could interact with the unsupported leading edge of the roof panel in such a manner as to set up undesirable vibrations in the roof panel, or in extreme cases, even tearing it free from the automobile body altogether.

When the transparent roof panel has been slid from its retracted position (FIGS. 3 and 6) to its normal (closed) position (FIGS. 1 and 4) the fingers 52 are adjacent to the transverse window frame member 26. Thus these fingers 52 are clear of the leading edges of the sunshade panels 36 and 38. The panels can therefore be independently, and progressively pulled manually in a forward direction (to the left in FIGS. 4–7) on the driver's side or passenger's side to cover selected amounts of the untinted or transparent aft two-thirds of the roof panel 32. It will be readily understood, of course, that an upper sunshade panel 36 must be pulled forward first before the sunshade panel 38 thereunder can be pulled forward. This is because the fingers 54 normally hold back the lower sunshade panels.

Having described several embodiments of our transparent roof convertible automobile, it will be apparent that modifications and adaptations thereof will occur to those skilled in the art. For example, the invention could be adapted to the body style illustrated in FIGS. 1–3 of co-pending U.S. patent application Ser. No. 855,821 which has no T-bar and in which the roof panel underlies the rear window when the roof panel is retracted. In such a modified version, the sun shade panels extend across the entire width of the roof opening. Only the portion of the roof panel that overlies the rear window need be substantially transparent. Therefore, the protection afforded our invention should only be limited in accordance with the scope of the following claims.

We claim:

1. In combination with an automobile body having a front windshield, a rear window and a pair of side doors cooperatively defining a passenger compartment with a roof opening;

a roll bar extending transversely across the body and separating the roof opening from the rear window;

a T-bar extending in a longitudinal direction between an upper edge of the front windshield and the roll bar substantially intermediate a transverse width of the roll bar;

a roof panel having an area corresponding to that of the roof opening, at least a portion of the roof panel being transparent and the roof panel being moveable over the roll bar from a normal position in which the roof opening is covered by the roof panel to a retracted position in which a transparent portion of the roof panel overlies the rear window and the roof opening is uncovered; and retractable sunshade means for covering selected amounts of the transparent portion of the roof panel when the roof panel is in its normal position, including a plurality of sunshade panels having inner edges slideable in a track member connected to the T-bar, the sunshade panels being moveable to stowed overlapping positions above the roll bar.

2. The combination of claim 1 and further comprising means for preventing movement of the sunshade panels when the roof panel is in its retracted position.

3. The combination of claim 1 wherein the automobile body includes a pair of inclined rear window pillars having tracks therein in which the opposite side edges of the roof panel travel.

4. The combination of claim 1 wherein there are a pair of upper sunshade panels and a pair of lower sunshade panels, the upper sunshade panels being slideable on opposite sides of the T-bar to fully closed positions in which they cover a middle one-third of the roof panel, and the lower sunshade panels being slideable on opposite sides of the T-bar to fully closed positions in which they cover a rearward one-third of the roof panel.

* * * * *